Patented Oct. 30, 1928.

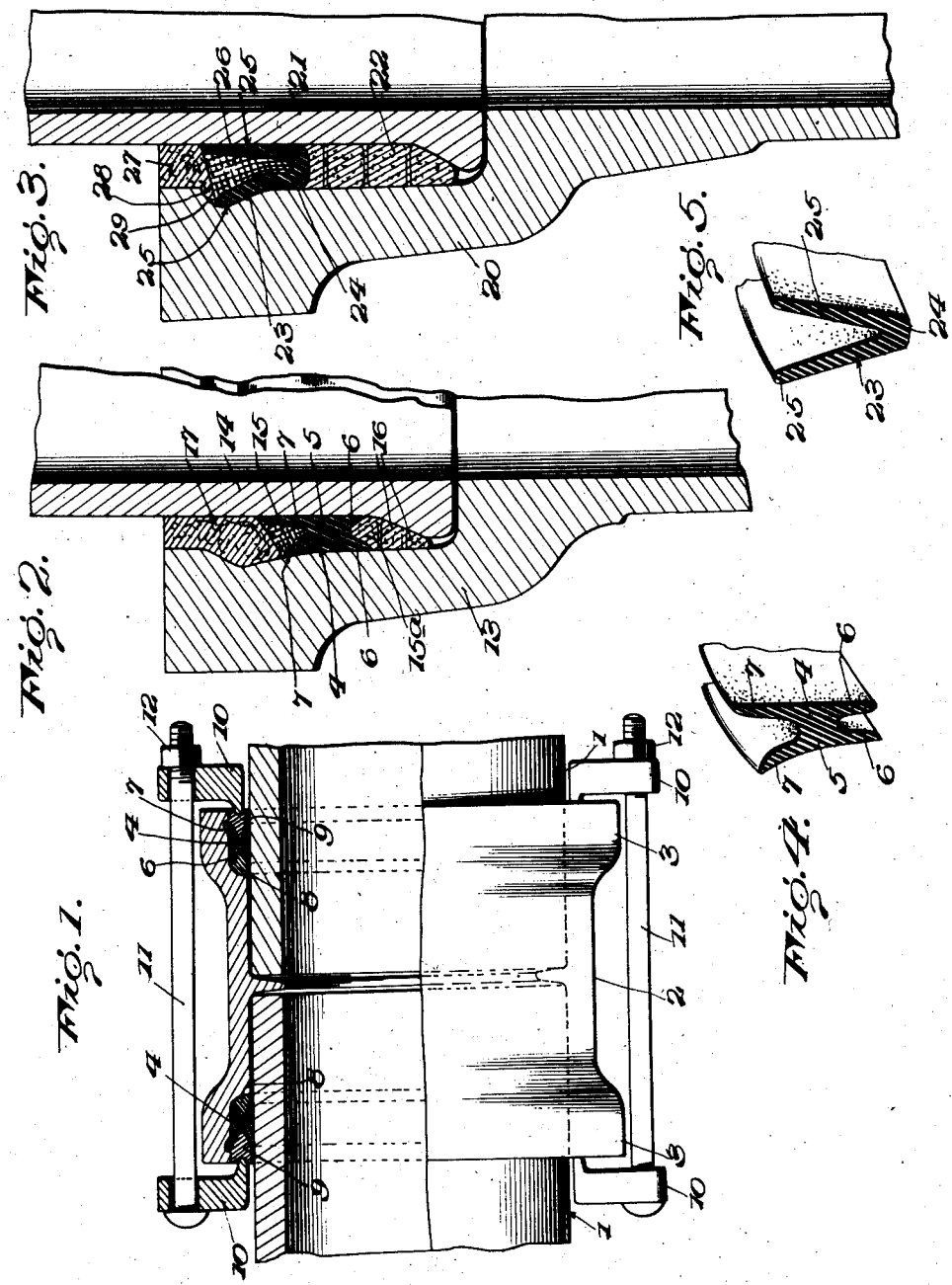

1,690,047

UNITED STATES PATENT OFFICE.

FRED C. ARMBRUSTER, OF SHREVEPORT, LOUISIANA, ASSIGNOR TO THE SOUTHWESTERN PIPE JOINT & ENGINEERING CO., OF BIRMINGHAM, ALABAMA, A CORPORATION OF ALABAMA.

JOINT CONSTRUCTION.

Application filed September 23, 1926. Serial No. 137,314.

This invention relates to an improved joint construction particularly adapted for use with the bell and spigot type of joint used on cast iron or steel pipe and bolted coupling joints although, of course, adapted for other uses and applications.

The object of the invention is to provide a joint of this character which is all the more effectively sealed when subjected to the pressure of liquids or gases tending to escape through the joint and thereby preventing leakage and maintaining a fluid-tight joint.

A further object is to provide a joint having these advantages and capacities and which is of simple and durable construction, reliable and effective in use and easy and comparatively inexpensive to build up.

Accordingly the present invention consists in the provision of a joint which embodies an elastic ring of rubber or other suitable material having a body portion and diverging wings, the diverging wings being co-operable with an expanding packing member so that when the ring is subjected directly or indirectly to the pressure of the gases or liquids tending to escape its wings and also its body portion will be expanded to increase the efficiency of its packing engagement with the portions of the bell and spigot or other parts which it packs.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a fragmentary view in vertical section showing the coupling joint of the bolted type embodying the present invention, Figure 2 is a view showing another embodiment of the invention as used with bell and spigot pipe, Figure 3 is a view showing a somewhat modified joint of the type illustrated in Fig. 2, and Figures 4 and 5 are detail views of the rubber rings employed in Figs. 1, 2 and 3, respectively.

Referring to the drawings and more particularly to Figs. 1 and 4, the numeral 1 designates pipe ends which extend into a coupling sleeve 2 having bells 3 at its opposite ends. In each bell 3 an elastic packing ring, designated generally at 4, is provided, the elastic packing ring 4 being constructed of rubber and having a body portion 5 and oppositely directed pairs of wings, one pair of wings being designated at 6 and the other pair of wings being designated at 7. The inner pair of wings 6 of each elastic or rubber packing ring 4 bears against an annular expanding member 8 which engages the shoulder of the bell and which acts as a base against which the ring 4 is pressed and expanded. The outer pair of wings 7 are expanded and covered by a combined sealing and expanding ring 9 of lead or other suitable material, the ring 9 serving not only to expand the wing 7 of the ring 4 but also serve to completely seal and shut off the elastic packing ring from the air and thereby serving to greatly prolong the life thereof. The combined sealing and expanding rings 9 of the opposed bells are firmly pressed against their elastic packing rings 4 by means of annular followers 10 drawn together by bolts 11 and nuts 12. It is to be understood, however, that if the combined sealing and expanding rings 9 are poured into place or otherwise suitably secured in position the glands 10 and bolts and nuts 11 and 12 may be omitted.

Figure 2 illustrates an elastic packing member 4 embodied in a pipe joint including a pipe having a bell 13 into which the spigot end 14 of an adjacent pipe is introduced. In this form of the invention the elastic packing member 4 is expanded by expanding members 15 and 15ᵃ. The member 15 may be of lead while the member 15ᵃ is formed of jute. Below the expanding member 15ᵃ jute packing 16 may be provided and above the expanding member 15 a sealing strip of lead or other suitable material, designated at 17, is arranged. Figs. 1, 2 and 4 show the elastic packing member of tubular form or of general H-shaped form. As shown in Figs. 3 and 5 the packing member may in some applications be of the single type in which event it is of approximately U-shape form. As illustrated in Fig. 3 the joint consists of a pipe having a bell 20 into which the spigot end 21 of another pipe is introduced. Jute packing 22 is provided between the bell and spigot and on top of the jute packing 22 an elastic sealing member 23 is positioned, the elastic sealing member 23 being of substantially U-shaped form and having a body portion 24 and slightly divergent wings 25. The elastic packing member 23 which may be of rubber or any other elastic material is expanded by a tapered expanding member 26 which may be of lead or any other suitable metal or alloy. The expanding member 26 may be held in position by a sealing member 27 of lead which may have a flange 28 integral therewith and having interlocking engagement with a groove 29 provided in the wall 11. In all forms of the invention pressure of the escaping fluid or of the fluid that tends to escape serves only to more effectively expand and tighten the packing since the wings of the elastic packing member being diverging and influenced by expanding members are subjected to a greater spreading action when subjected to fluid pressure.

I claim:—

1. A joint of the bell and spigot type having a fibrous packing, an elastic ring above said packing including a body portion and divergent wings extending upwardly from the body portion, a tapered lead expanding strip positioned between the divergent wings, and a sealing ring of cast lead above said expanding strip.

2. A joint of the bell and spigot type including fibrous packing engaged with the bell and spigot, an elastic ring above said fibrous packing and having a body portion, oppositely directed pairs of diverging wings, the lower pair of diverging wings being engaged and expanded by convolutions of fibrous packing, a tapered lead expanding strip co-operable with the upper pair of diverging wings, and a cast lead sealing ring above said lead expanding strip.

3. A joint of the bell and spigot type having a ring of rubber including a body portion, wings extending from the body portion, an expanding member co-operable with the wings, fibrous packing co-operable with the ring of rubber, and means for holding the expanding member, ring and fibrous packing in position.

FRED C. ARMBRUSTER.